United States Patent [19]

van Capelleveen

[11] 4,201,288
[45] May 6, 1980

[54] LINK CHAIN CONVEYOR ASSEMBLY

[75] Inventor: Pieter van Capelleveen, Zeist, Netherlands

[73] Assignee: Gebr. van Capelleveen B.V., Netherlands

[21] Appl. No.: 883,974

[22] Filed: Mar. 6, 1978

[30] Foreign Application Priority Data

Mar. 8, 1977 [NL] Netherlands .......................... 7702497
Jan. 19, 1978 [NL] Netherlands .......................... 7800640

[51] Int. Cl.² ............................................ B65G 21/18
[52] U.S. Cl. ..................................... 198/778; 198/814
[58] Field of Search ............... 198/778, 813, 814, 815, 198/816, 817; 74/243 H, 245 C, 250 R, 250 C

[56] References Cited

U.S. PATENT DOCUMENTS

| | | | |
|---|---|---|---|
| 1,831,330 | 11/1931 | Thompson | 198/778 |
| 2,101,685 | 12/1937 | Nisbet | 74/243 H |
| 3,252,564 | 5/1966 | Stewart et al. | 198/814 |
| 3,266,331 | 8/1966 | Burrows | 74/243 H |
| 3,500,989 | 3/1970 | Cripe et al. | 198/778 |
| 3,664,487 | 5/1972 | Ballenger | 198/778 |
| 3,892,184 | 7/1975 | Kenn et al. | 74/245 C X |
| 3,904,025 | 9/1975 | Garvey | 198/778 |

*Primary Examiner*—James L. Rowland
*Attorney, Agent, or Firm*—Pollock, Vande Sande & Priddy

[57] ABSTRACT

A conveyor suitable for displacing pans containing dough portions in a proofing chamber according to a continuous spiral, actually helical track, of which conveyor the conveyor is formed by at least one chain and a plurality of driving devices which engage the chain at different levels of the spiral track, said spiral track comprising parallel, rectilinear sections and curved connection bends, the driving devices being designed as pocketed sheaves which in rectilinear track sections engage the chain or chains, said chains being designed as a link chain of the ship's anchor chain type and guided in fitting sections, there being disposed chain tensioners means at each driving pocketed sheave.

11 Claims, 9 Drawing Figures

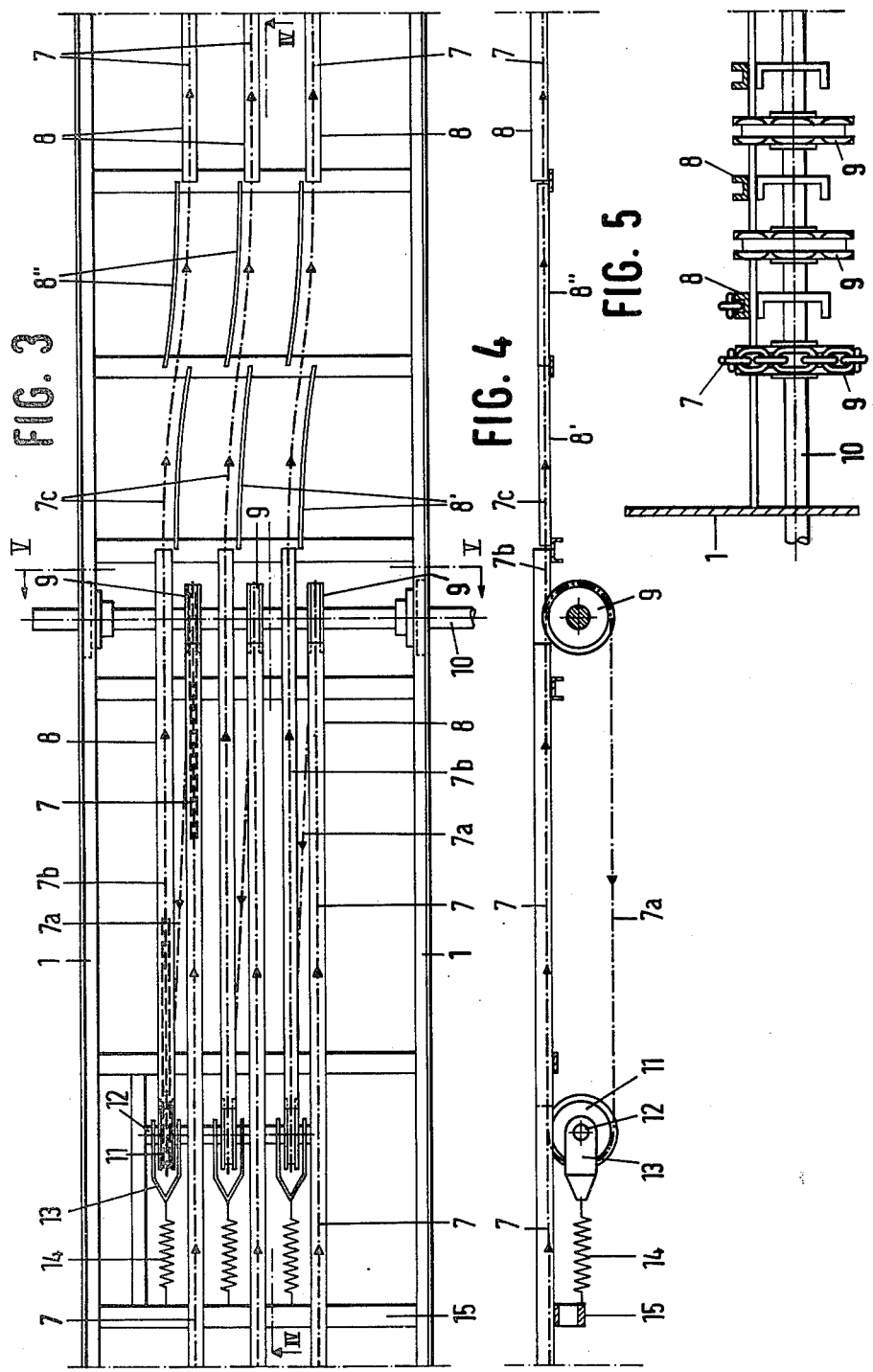

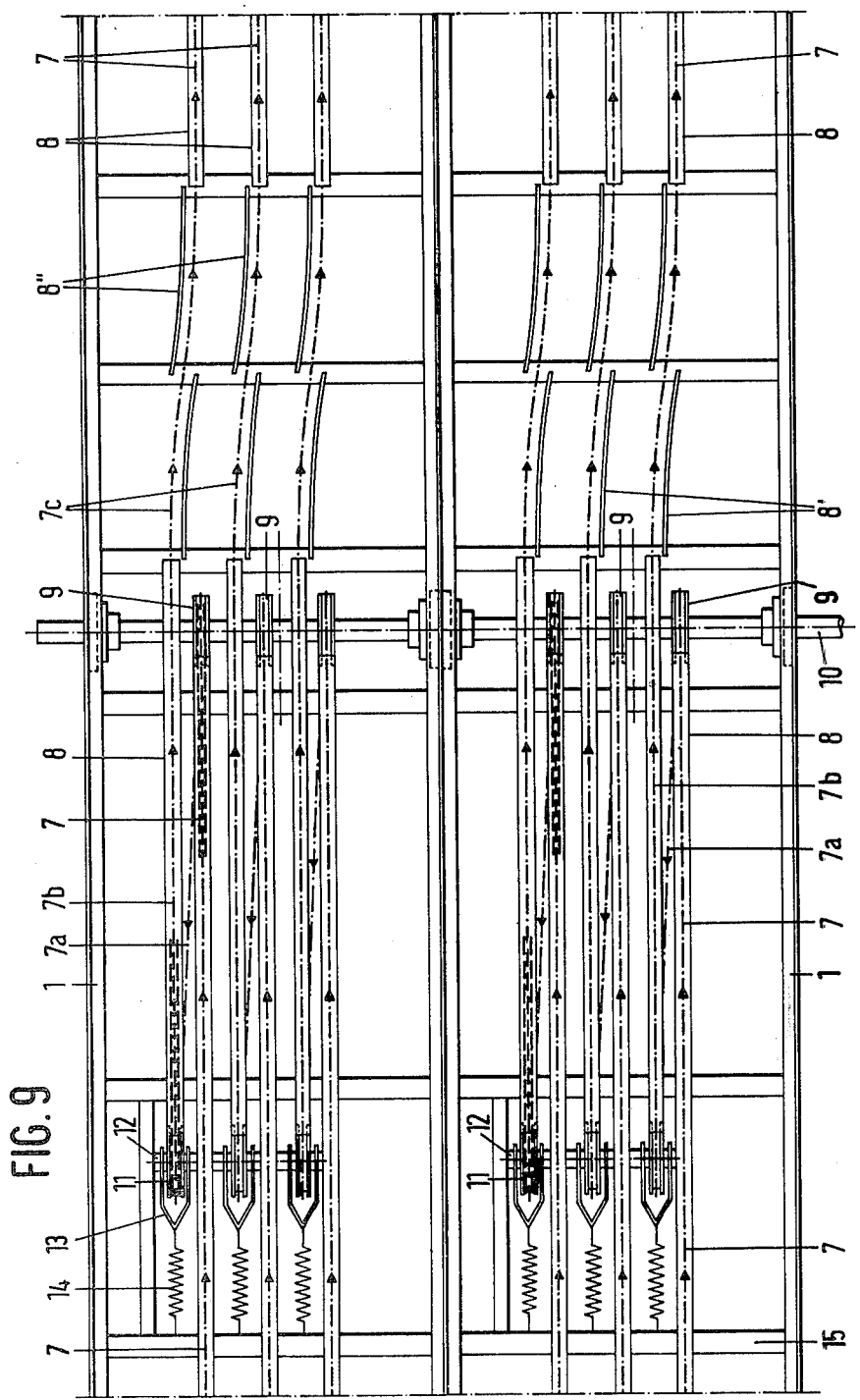

LINK CHAIN CONVEYOR ASSEMBLY

BACKGROUND OF THE INVENTION

The present invention relates to a proofing chamber for dough portions, in particular to a conveyor used in such a chamber.

In a proofing chamber pans are circulated for some time under specific conditions that are favorable to the proofing of the dough portions placed in the pans, and prior art proofing chambers are fitted therefor with a conveyor for circulating the pans in a vertical plane between a feeder station and a discharge station where the pans are introduced into, and removed from, the circulation circuit, respectively. A drawback associated with such prior art proofing chamber constructions is that the conveyor used therein operates discontinuously i.e., it has to be in the rest position during the supply and discharge of pans, or, in case of a continuously operating conveyor, complicated feeder and discharge mechanisms are required for the dough pieces, as described in Dutch Pat. No. 22,757 of Baker Perkins Ltd. Moreover with respect to the total dimensions of prior art proofing chambers, assuming that the conveyor is incorporated in an insulating housing, the capacity thereof is comparatively small.

A larger capacity than prior art proofing chambers are the cooling columns employed in bakeries, whereby baked loaves are advanced on a belt-shaped conveyor according to a spiral track between a feeder and a discharge station and can cool off during residence in the column. The conveyors used in such coolers have a belt-shaped or lattice-shaped working face on which separate loaves should be able to rest, and as a result are rather complicated and hence expensive.

OBJECTS AND SUMMARY OF THE PRESENT INVENTION

It is an object of the present invention to provide a proofing chamber that eliminates the above described drawbacks of prior art chambers, by means of which through application of simple conveying means, the capacity of a cooler of comparable dimensions is approximated.

To this effect the invention provides a conveyor suitable for displacing pans containing dough portions in a proofing chamber according to a continuous spiral track, of which conveyor the transport means is formed by at least one chain and a plurality of driving means which engage the chain at different levels of the spiral track, as basically disclosed in U.S. Pat. No. 3,904,025 to Garvey, which conveyor is characterized in that the spiral track comprises parallel, rectilinear sections and curved connection bends, while the driving means are designed as pocketed sheaves which, in rectilinear track sections, engage the chain or chains, said chain or chains being designed as a link chain of the ship's anchor chain type and being guided in fitting sections, and there being provided chain tensioning means at each driving pocketed sheave.

The invention is based on the insight that for circulating pans in a proofing chamber it will be sufficient to provide comparatively inexpensive link chains of the ship's anchor type which are guided in known per se sections, whereby the portions of the link chain or chains extending beyond the sections and lying in the transport plane of the conveyor, through engagement of the bottoms of pans positioned thereon, will displace same in a reliable manner. By using a drive of the type described in U.S. Pat. No. 3,904,025 having chains extending the entire track, a minimal chain length and a minimal occupation of space for the conveying means will suffice, while avoiding—by driving the chain in several places—large tensions in the chain with inherent rapid wear and moreover, especially in bends, unfavorably high frictions relative to the guide sections. The driving pocketed sheaves which, in each of the rectilinear track sections, engage the link chain or chains, may be connected to a single common drive motor. Downstream of each bend a driving pocketed sheave therefore engages a continuous chain, so that each sheave needs to transmit only a very limited quantity of energy to the chain.

In a transport track of the present type, having rectilinear track sections, interconnected through bends, it is conventional to pre-stress the bend portions outwardly in order to take up any elongation in the chain occurring during operation. It will be clear that this is a very expensive solution from a constructive viewpoint.

In a proofing chamber of the present type, however, there is little room for chain tensioning means, in general for auxiliary devices, especially when use is made of a plurality of adjacently arranged chains and furthermore when for an optimum capacity of the device, the successive levels are positioned as close as possible to each other.

Taking the above into account, the chain tensioning means according to the invention may comprise a freely rotating tensioning sheave at each driven pocketed sheave, the shaft of the freely rotating sheave arranged in the transport direction behind the driven sheave, being pre-stressed in the direction facing away from the driven sheave, e.g. by means of a tension spring. The tensioning means according to the invention thus need not occupy space in the proofing chamber required for the transport of pans, since the freely rotating sheave can be present at the same level as the driven pocketed sheave and may have substantially the same dimensions.

The driven sheave and the freely rotating tensioning sheave may be arranged in adjacent vertical planes, the link chain being guided over the top side of the driven pocketed sheave, subsequently along the bottom towards the bottom side of the tensioning sheave, extending from the top side thereof again forwardly; downstream of the driven sheave, the chain is brought through side guides from the vertical working plane of the tensioning sheave in the vertical working plane of the drive sheave so that already at a very short distance downstream of the driven sheave, the chain lies again exactly in the extension of the chain portion extending towards the driven sheave.

Summarizing the above it can be stated that the choice of continuous link chains of the ship's anchor type for the transport of pans in a proofing chamber, provided applied in the manner as described in the above, offers many advantages, such as low cost, minimal occupation of space and hence larger capacity of the proofing chamber and, as a result of the slight weight of a link chain as compared to a conveyor belt, a conveyor grid and the like, a slight power consumption for the drive.

In a further embodiment of the invention, the proofing chamber may be provided, for a better utilization of the inner space thereof, with a conveyor having two concentric, spiral (actually helical) tracks, viz. an ascending and a descending track, which conveyor principle is basically known from German Offenlegungsschrift No. 2,159,438 of Ballenger, and being characterized in that adjoining, rectilinear track sections of the ascending and the descending spiral lie in side by side relationship, in a substantially horizontal plane, so that the respective connection bends are oppositely inclined. It will be clear that in this manner the conveyor supporting carrier frame may be of simpler design, since the rectilinear track sections of both the ascending and the descending portion of the conveyor may be made as an integral unit.

According to the invention it is possible in the adjacently positioned portions of the ascending and the descending track, to mount the driving, respectively the tensioning sheaves for the chains of both track sections each time on common shafts so that the drive of chain parts from the ascending and the descending track can each time be driven from a single shaft. This is considerable simpler from a constructive viewpoint and hence cheaper than in case of a separate drive.

BRIEF DESCRIPTION OF THE DRAWINGS

Some embodiments of the conveyor according to the invention will now be described by way of example, with reference to the accompanying drawings.

FIG. 3 is an enlarged detail of the conveyor taken along the arrows III—III in FIG. 1;

FIG. 4 is a side elevational view along the arrows IV—IV, of the detail shown in FIG. 3;

FIG. 5 is a sectional view along the arrows V—V in FIG. 3;

FIG. 9 is a view in accordance with FIG. 3, of the conveyor in the embodiment shown in FIGS. 6-8.

DETAILED DESCRIPTION OF THE PREFERRED EMBODIMENT

Figure 1:
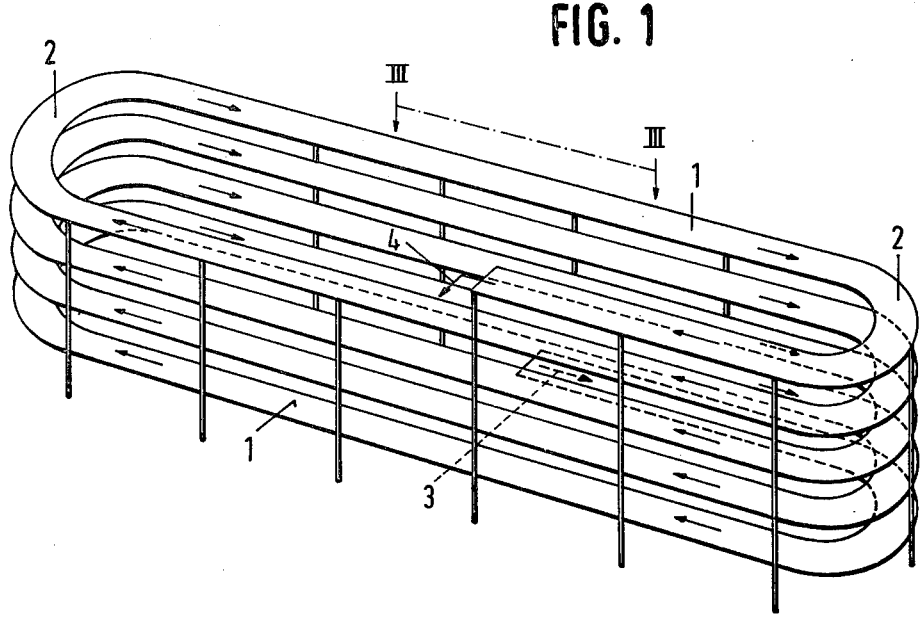
FIG. 1 is a perspective view of the schematically shown conveyor having a single spiral track.
Figure 2:
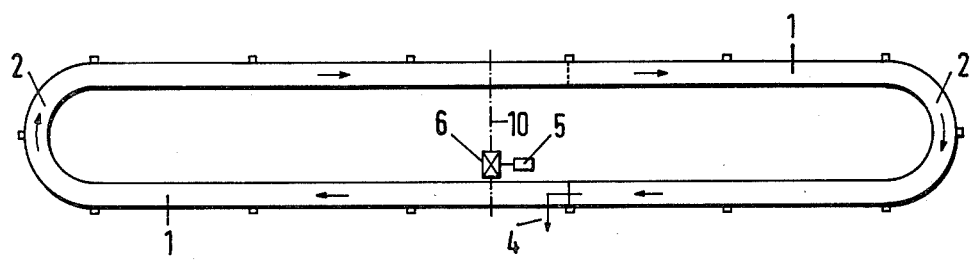
FIG. 2 is a plan view of the conveyor shown in FIG. 1.

As illustrated in the drawings, especially FIG. 1, the conveyor according to the invention, which is excellently suited for use in a so-called proofing chamber, has a spiral transport path comprising substantially horizontal, rectilinear portions 1 and curved bends 2. An arrow 3 indicates the inlet end for pans (not shown) and an arrow 4 shows the outlet end. FIG. 2 shows schematically a central drive including a motor 5 and a gearing 6. Though the number thereof is variable, FIGS. 3-5 show three chains 7. Each chain 7 extends continuously from the inlet end 3 via all rectilinear track portions 1 and bends 2 up to the outlet end 4 and is subsequently passed downwards, back to the inlet end 3.

Chains 7 are link chains, as clearly shown in FIG. 5, that is to say, chains composed of links in the form of round or substantially elliptic rings. Throughout the conveying path they are passed over and into guide sections 8 in such a manner that if pans (not shown) are put on the conveyor, they are entrained with the moving chains.

For driving the chains use is made of so-called pocketed sheaves 9 known for the purpose, one of which drivingly engages a chain on each level of the conveyor, according to the invention, but preferably on each rectilinear portion 1. From FIGS. 3 and 5 it can be seen that the pocketed sheaves 9 are mounted on a driving shaft 10, each driving shaft 10 being connected to the gearing 6 (FIG. 2).

To maintain a uniform tension in chains 7, a tensioning sheave 11 is provided at each driving sheave 9, obliquely behind the sheave 9. Each tensioning sheave 11 is mounted for free rotation on a shaft 12, which is engaged by a fork 13. Fork 13 is connected to a beam 15 of the frame of the conveyor by means of a tension spring 14.

The chain track in the driving and tensioning means is as follows. A chain 7 arrives at the top of a driving sheave 9 and is passed along the bottom thereof (7a) to the bottom of the associated tensioning sheave 11. Part 7b extending from the top of the tensioning sheave 11 into the direction of transport is laterally displaced with respect to the path of chain 7 and has to be returned therein as soon as possible. To this end, use is made of guide sections 8' and 8", which correspond with sections 8 but are placed on edge. Guided by the set of sections 8' and 8" the chain 7 traverses a curved "correction path" 7c.

Figure 7:
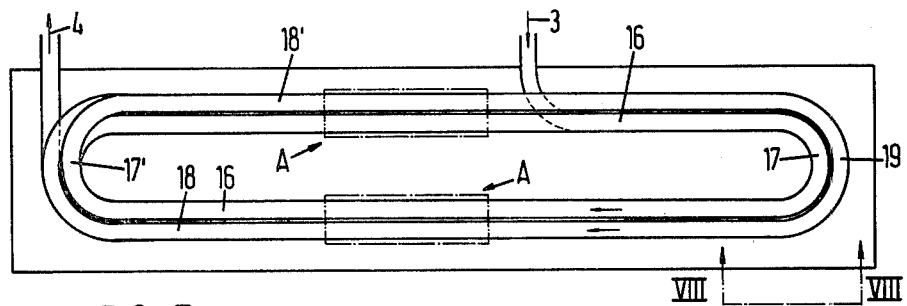
FIG. 7 is plan view of the conveyor shown in FIG. 6.
Figure 6:
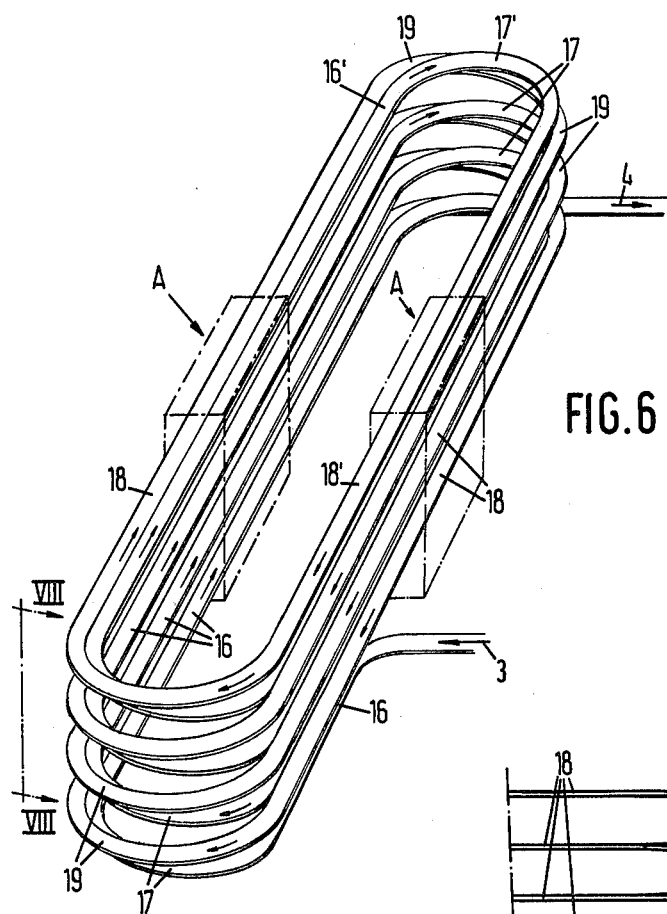
FIG. 6 is a perspective view of the conveyor in an embodiment having two concentric tracks.
Figure 8:
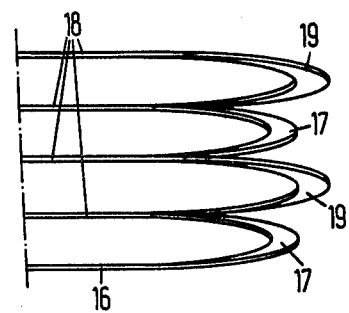
FIG. 8 is a detailed side elevational view along the arrows VIII—VIII in FIG. 7 and FIG. 6.

In the embodiment shown in FIGS. 6–8 a descending track is provided on the outside of a spiral, ascending track corresponding with the path of the conveyor shown in FIGS. 1–5. Both the ascending and the descending track comprise horizontal rectilinear portions interconnected by curved bends. The inlet and outlet end are shown by arrows 3 and 4, respectively. The horizontal rectilinear portions 16 of the ascending track located on the inside of the double spiral in the embodiment shown, but which may just as well be located on the outside, are connected at the ends to ascending bend portions 16, and the uppermost horizontal portion 16' of the ascending portion of the conveyor is connected via an ascending bend 17' to the uppermost rectilinear horizontal portion 18' of the descending conveyor path. The remaining rectilinear portions 18 of the descending track are interconnected at the ends by descending bends 19.

Except on the lowermost and uppermost level, the horizontal rectilinear portions of the conveyor each contain a portion 18 of the descending track and a portion 16 or 16' of the ascending track immediately beside and against one another, so that these rectilinear portions of the conveyor can be produced as a unit, to which portions on each end thereof an ascending bend portion 17 or 17' and a descending bend portion 19 are connected while being oppositely curved. In the rectilinear portions of the conveyor the transport directions of the ascending and descending track are equal.

In the spaces indicated by A and surrounded by chain lines are positioned the drive of the chains.

At each level the drive and the tensioning means used correspond with what is shown in FIG. 3, the difference being that a double construction is used, as shown in FIG. 9, which means that besides the assembly shown in FIG. 3 of three driving pocketed sheaves 9 mounted on a shaft 10, three additional such pocketed sheaves 9 are mounted on the extended shaft 10. The superposed shafts 10 may be connected to a common drive motor by means of gears and chain transmissions. Also the shafts 12 for tensioning sheaves 11 may be extended to the adjacent rectilinear conveyor track portion, if desired, and may support three tensioning sheaves 13 for the three chains, assuming that in the embodiment shown in FIGS. 6-8 use is also made of three parallel chains.

I claim:

1. A link chain conveyor assembly for transporting dough pans through a proofing chamber and the like, and comprising:

a substantially helically-shaped, continuous track assembly made up of a plurality of parallel, substantially straight track sections forming a plurality of vertically spaced levels of said conveyor assembly, wherein each pair of straight track sections positioned on adjacent levels is interconnected by a further curved track section sloping therebetween;

each of said straight and curved track sections including a pair of spaced side wall portions interconnected by at least one connecting member and each of said substantially straight track sections further including a drive shaft extending between said spaced side wall portions, with at least one pocket sheave fixedly mounted on each drive shaft;

an endless link chain assembly positioned between the spaced side wall portions of said track sections and supported on said connecting members, with a portion of endless link chain extending about a portion of at least one of the pocket sheaves mounted between the side walls of each of the substantially straight track sections, whereby rotation of said drive shafts and said attached pocket sheaves results in movement of said link chain along said continuous track assembly; and tensioning means mounted between the spaced side walls of each of said straight track sections for engaging and tensioning a portion of said link chain extending between a pair of adjacent pocket sheaves.

2. A conveyor assembly according to claim 1, wherein drive means interconnect each of said drive shafts with a motor and gear assembly for driving said drive shaft and the pocket sheaves mounted thereon in response to selective actuation of said motor.

3. A conveyor assembly according to claim 1, wherein said dough pans directly contact said endless link chain, with said link chain transporting said dough pans from an inlet of said track assembly to an outlet of said track assembly.

4. A conveyor assembly according to claim 1 wherein said conveyor includes a pair of concentrically arranged, substantially helically-shaped continuous track assemblies, one of said track assemblies having an inlet positioned on a first vertical level and further having an outlet positioned on a second, higher vertical level, said remaining track assembly having an inlet joining the outlet of said one track assembly and said remaining track assembly further having an outlet on the same level as the inlet of said one track assembly with a continuous link chain assembly positioned between spaced side wall portions formed along opposite sides of each of said track assemblies.

5. A conveyor assembly according to claim 4 wherein each of said concentric track assemblies is made up of a plurality of substantially straight track sections extending in separate horizontal planes vertically spaced from one another, and a plurality of curved track sections sloping between adjacent straight sections, with the curved track sections of said one track assembly sloping in the opposite direction from the curved track section of said remaining track assembly, whereby a dough pan positioned on the link chain at the inlet of said one track assembly is transported by said link chain to the outlet of said remaining track assembly.

6. A conveyor assembly according to claim 5, wherein the plurality of substantially straight track sections of each track assembly are positioned adjacent to one another, with a drive shaft extending between the spaced side wall portions of each pair of said straight track sections and at least one pocket sheave fixedly mounted on said drive shaft between each pair of spaced side wall portions.

7. A conveyor assembly according to claim 6, wherein separate tensioning means are mounted between the spaced side walls of each of the straight track sections forming both of said track assemblies for engaging and tensioning a portion of said link chain extending between a pair of adjacent pocket sheaves on each of said track assemblies.

8. A conveyor assembly according to either claims 1 or 7, wherein said tensioning means comprises a freely rotating sheave mounted on a shaft extending between the spaced side wall portion of said straight track sections, said tensioning means further comprises a spring member extending between said freely rotating sheave and a frame portion of said substantially straight track section, with said spring functioning to bias said freely rotating sheave in a direction facing away from said pocket sheave mounted within the same substantially straight track section, whereby said freely rotating sheave tensions a portion of said link chain extending between adjacent pocket sheaves.

9. A conveyor assembly according to claim 8, wherein said pocket sheaves and said freely rotating sheaves are arranged in juxtapositioned vertical planes, with said link chain extending over the vertically upper portion of said pocket sheave, and subsequently extending towards the vertically lower portion of an adjacent freely rotating sheave, with said link chain passing over the vertically upper portion of said freely rotating sheave and extending in a downstream direction toward a further pocket sheave.

10. A conveyor assembly according to claim 9, wherein a plurality of separate guide vanes are mounted end to end on each of said substantially straight track sections, with said plurality of guide vanes gradually extending between the vertical plane including said freely rotating sheave and the juxtapositioned vertical plane including said pocket sheave, whereby said plurality of guide vanes functions to align said endless link chain extending between adjacent pocket sheaves.

11. A conveyor assembly according to claims 1 or 4, wherein a plurality of endless link chain assemblies each extend parallel to one another between spaced side wall portions. of said track sections, with a corresponding plurality of pocket sheaves mounted between the spaced side wall portions of said track sections.

* * * * *